(12) United States Patent
Azoulai et al.

(10) Patent No.: US 11,984,970 B2
(45) Date of Patent: May 14, 2024

(54) METHOD AND A SYSTEM FOR THE AUTOMATIC DETECTION OF A JAMMING OF A SATELLITE NAVIGATION SYSTEM

(71) Applicant: Airbus Operations (S.A.S.), Toulouse (FR)

(72) Inventors: Laurent Azoulai, Toulouse (FR); Philippe Delga, Toulouse (FR); François Tranchet, Toulouse (FR); Rémy Lazzerini, Toulouse (FR); Jean Pasquie, Toulouse (FR); Ludovic Parisot, Toulouse (FR); Philippe Merceron, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 611 days.

(21) Appl. No.: 17/176,757

(22) Filed: Feb. 16, 2021

(65) Prior Publication Data

US 2021/0266091 A1 Aug. 26, 2021

(30) Foreign Application Priority Data

Feb. 24, 2020 (FR) ...................... 2001816

(51) Int. Cl.
*H04K 3/00* (2006.01)
*G01S 19/21* (2010.01)
*H04B 7/185* (2006.01)

(52) U.S. Cl.
CPC .............. *H04K 3/22* (2013.01); *G01S 19/21* (2013.01); *H04B 7/18506* (2013.01); *H04B 7/18521* (2013.01)

(58) Field of Classification Search
CPC ........ G01S 19/215; G01S 19/21; G01S 19/20; G01S 19/258; H04K 3/22; H04K 3/222;
(Continued)

(56) References Cited

U.S. PATENT DOCUMENTS 5,944,132 A * 8/1999 Davies ................... A63B 69/36
701/470
7,512,492 B2 * 3/2009 Irvin ....................... G01S 19/21
701/473
(Continued)

OTHER PUBLICATIONS

Fu, et al., "Detection techniques for data-level spoofing in GPS-based phasor measurement units", 2016 International Conference on Selected Topics in Mobile & Wireless Networking (Mownet), IEEE, pp. 1-8 (Apr. 11, 2016).
(Continued)

*Primary Examiner* — Vladimir Magloire
*Assistant Examiner* — Michael W Justice
(74) *Attorney, Agent, or Firm* — KDW Firm PLLC (57) ABSTRACT

A system includes at least one reception unit installed in an aircraft and configured for tracking satellites of the satellite navigation system of the GNSS type. The system includes a generation unit for generating an expected number corresponding to the number of satellites that the reception unit is expected to track, a detection unit including a comparison part for comparing the expected number with a tracked number corresponding to the number of satellites that the reception unit is actually tracking and a decision part for detecting a jamming, as a function of the result of the comparison made by the comparison part and transmitting detection data in the event of detection, and a transmission unit configured to transmit jamming detection data to at least one user device, the system making it possible to detect a jamming of a GNSS system in an automatic and reliable manner.

17 Claims, 3 Drawing Sheets

(58) Field of Classification Search
CPC . H04K 3/224; H04K 3/90; H04K 3/65; H04B 7/18506; H04B 7/18521; H04B 7/18513
USPC ............... 342/357.59, 357.45, 14, 16, 13
See application file for complete search history.

(56) References Cited

U.S. PATENT DOCUMENTS

| | | | | |
|---|---|---|---|---|
| 7,800,533 | B2* | 9/2010 | Harper | G01S 19/215 |
| | | | | 342/357.58 |
| 10,024,975 | B2* | 7/2018 | Dougan | G01S 19/015 |
| 10,190,879 | B2* | 1/2019 | Garcia Morchon | G01S 19/09 |
| 10,281,583 | B2* | 5/2019 | Leibner | G01S 19/215 |
| 11,169,274 | B2* | 11/2021 | Viswanathan | G05D 1/0088 |
| 11,442,173 | B2* | 9/2022 | Kim | G01S 19/39 |
| 11,740,362 | B2* | 8/2023 | Marmet | G01S 19/215 |
| | | | | 701/469 |
| 2003/0114983 | A1* | 6/2003 | Irvin | G01S 19/21 |
| | | | | 701/473 |
| 2010/0127920 | A1* | 5/2010 | Harper | G01S 19/215 |
| | | | | 342/357.58 |
| 2016/0154113 | A1* | 6/2016 | Leibner | G01S 19/21 |
| | | | | 342/357.59 |
| 2016/0341830 | A1* | 11/2016 | Dougan | G01S 19/03 |
| 2018/0216934 | A1* | 8/2018 | Garcia Morchon | G01S 19/42 |
| 2020/0132858 | A1* | 4/2020 | Viswanathan | G05D 1/0278 |
| 2020/0241146 | A1* | 7/2020 | Kim | G01S 19/39 |
| 2020/0371247 | A1* | 11/2020 | Marmet | G01S 19/215 |

OTHER PUBLICATIONS

Oonincx, et al., "Effects of Jamming on the Accuracy of GPS Position Solutions in an Experimental Set-up", GNSS 2016—Proceedings of the 29th International Technical Meeting of the Institute of Navigation (ION GNSS+ 2016), The Institute of Navigation, pp. 217-222 (Sep. 16, 2016).

Truffer et al., "Jamming of Aviation GPS Receives: Investigation of Field Trials Performed with Civil and Military Aircraft", GNSS 2017—Proceedings of the 30th International Technical Meeting of the Satellite Division of the Institute of Navigation (ION GNSS+ 2017), The Institute of Navigation, pp. 1258-1266 (Sep. 29, 2017).

French Search Report for Application No. 2001816 dated Oct. 14, 2020.

* cited by examiner

METHOD AND A SYSTEM FOR THE AUTOMATIC DETECTION OF A JAMMING OF A SATELLITE NAVIGATION SYSTEM

CROSS-REFERENCE TO RELATED APPLICATION

This application claims priority to French patent application number 20 01816 filed on Feb. 24, 2020, the entire disclosure of which is incorporated by reference herein.

TECHNICAL FIELD

The disclosure herein relates to a method and a system for the automatic detection of a jamming of a satellite navigation system.

BACKGROUND

It is known that an aircraft, in particular a transport aircraft, generally comprises a reception unit installed in the aircraft and configured to track satellites of a satellite navigation system of the GNSS (acronym of "Global Navigation Satellite System") type, for example a satellite positioning system of the GPS (acronym of "Global Positioning System") type or any other known system. The following description will consider data of a GPS system.

Usually, such a reception unit generally comprises a first antenna and a second antenna, a receiver associated with each of these antennas, a data collecting unit and a data processing unit notably making it possible to determine the current position of the aircraft.

This determination of position, and communication, navigation and monitoring of the aircraft functions which depend on this determination of position can be degraded in the presence of radiofrequency interference. It is mainly a matter of radiofrequency interference affecting the use of the so-called "L1" signals of the GNSS system, that is to say GPS signals having a frequency of 1575.42 Mhz. Such radiofrequency interference can generate a GNSS jamming giving rise to the loss of the GNSS signal.

GNSS jammings of this type are becoming increasingly more frequent, because of the growth in the number of events likely to create such radiofrequency disturbance (or interference). These events often occur in conflict zones, but they can also take place in non-conflict zones, during military exercises, failures of a television broadcasting transmitter or illegal uses of personal devices.

At present there are no means or robust solutions, available to civil aviation, for detecting such a GNSS jamming capable of disturbing the functioning of systems of the aircraft.

SUMMARY

The purpose of the disclosure herein is to overcome this disadvantage. It relates to a method for the automatic detection of a jamming of a satellite positioning system, using a detection system comprising at least one reception unit installed in an aircraft.

According to the disclosure herein, the method comprises at least the following series of steps:
a generation step, implemented by a generation unit, consisting of or comprising generation of a so-called expected number corresponding to the number of satellites that the reception unit is expected to track;
a detection step, implemented by a detection unit, comprising:
a comparison sub-step, implemented by a comparison part, consisting of or comprising comparing the expected number with a so-called tracked number corresponding to the number of satellites that the reception unit is actually tracking; and
a decision sub-step, implemented by a decision part, consisting of or comprising detecting, if need be, a jamming as a function of the result of the comparison implemented in the comparison sub-step and emitting detection data in the event of detection of a jamming; and
a transmission step, implemented by a transmission unit, consisting of or comprising transmitting, if need be, the jamming detection data to at least one user device.

Preferably, the series of steps of the method is used in a repetitive manner.

Thus, thanks to the disclosure herein, it is possible to detect a GNSS jamming giving rise to a loss of GNSS signal, automatically and reliably, using data processed in a usual manner by the reception unit. This detection does not necessitate specific means and its result can be transmitted to various users, such as a pilot, on-board systems or air traffic control. Thanks to such detection of a jamming, the appropriate measures can be taken, notably on the aircraft and/or in the air traffic control context.

Advantageously, the reception unit comprising at least two receivers, the comparison sub-step compares the expected number with the tracked number for each of the two receivers and the decision sub-step detects a jamming uniquely when the results of two comparisons implemented in the comparison sub-step each correspond to a jamming.

In a first (preferred) embodiment, the generation step generates, as an expected number, the average of the number of satellites actually tracked by the reception unit over a sliding time window, the time window having a predetermined duration, being prior to the current time and ending at the current time.

Moreover, in a second embodiment, the generation step generates the expected number, from the current position of the aircraft, from the current time and from a satellite almanac which indicates the position of the satellites of the satellite navigation system as a function of time.

Advantageously, the decision sub-step detects a jamming when the difference between the expected number and the tracked number is greater than 3.

Moreover, advantageously, the method comprises at least one of the following filtering steps:
a first filtering step consisting of or comprising not taking detection data into account when the aircraft has a current lateral attitude greater than a maximum lateral attitude; and/or
a second filtering step consisting of or comprising not taking detection data into account when the aircraft is on the ground.

Moreover, advantageously, the decision sub-step consists of or comprises detecting at least one of the following disturbances (other than jamming):
masking by at least one building, on the ground;
ionospheric disturbance, in flight.

Moreover, advantageously, the method comprises an additional step consisting of or comprising generating a geographic jamming map from detection data received from a plurality of aircraft.

Moreover, advantageously, the transmission step consists of or comprises transmitting, if need be, the jamming detection data to at least one user device installed in the aircraft and/or to at least one user device situated outside of the aircraft, notably on the ground.

The disclosure herein also relates to a system for the automatic detection of a jamming of a satellite navigation system, the detection system comprising at least one reception unit installed in an aircraft and configured for tracking satellites of the satellite navigation system.

According to the disclosure herein, the detection system comprises moreover:
- a generation unit configured for generating a so-called expected number corresponding to the number of satellites that the reception unit is expected to track;
- a detection unit comprising:
  - a comparison part, configured for comparing the expected number with a so-called tracked number corresponding to the number of satellites that the reception unit is actually tracking; and
  - a decision part, configured for detecting, if need be, a jamming as a function of the result of the comparison implemented by the comparison part and sending detection data in the event of detection of a jamming; and
- a transmission unit, configured for transmitting, if need be, jamming detection data to at least one user device.

Advantageously, the reception unit comprises at least a first antenna, a second antenna, a first receiver associated with the first antenna, a second receiver associated with the second antenna, and a data collecting unit, and:
- the comparison part is configured for comparing the expected number with the tracked number for each of the two receivers; and
- the decision part is configured for detecting a jamming uniquely when the results of two comparisons made by the comparison part each correspond to a jamming.

In a first embodiment, the detection unit is installed in the aircraft.

Moreover, in a second embodiment, the detection unit is installed in a data processing device installed in a station on the ground and it is connected by a data transmission link at least to the reception unit installed in the aircraft.

In this second embodiment, advantageously, the data processing device is configured for receiving data from a plurality of different aircraft, each equipped with a reception unit.

BRIEF DESCRIPTION OF THE DRAWINGS

The appended figures will give a good understanding of how the disclosure herein can be embodied. In these figures, identical references denote similar elements.

DETAILED DESCRIPTION

Figure 1:
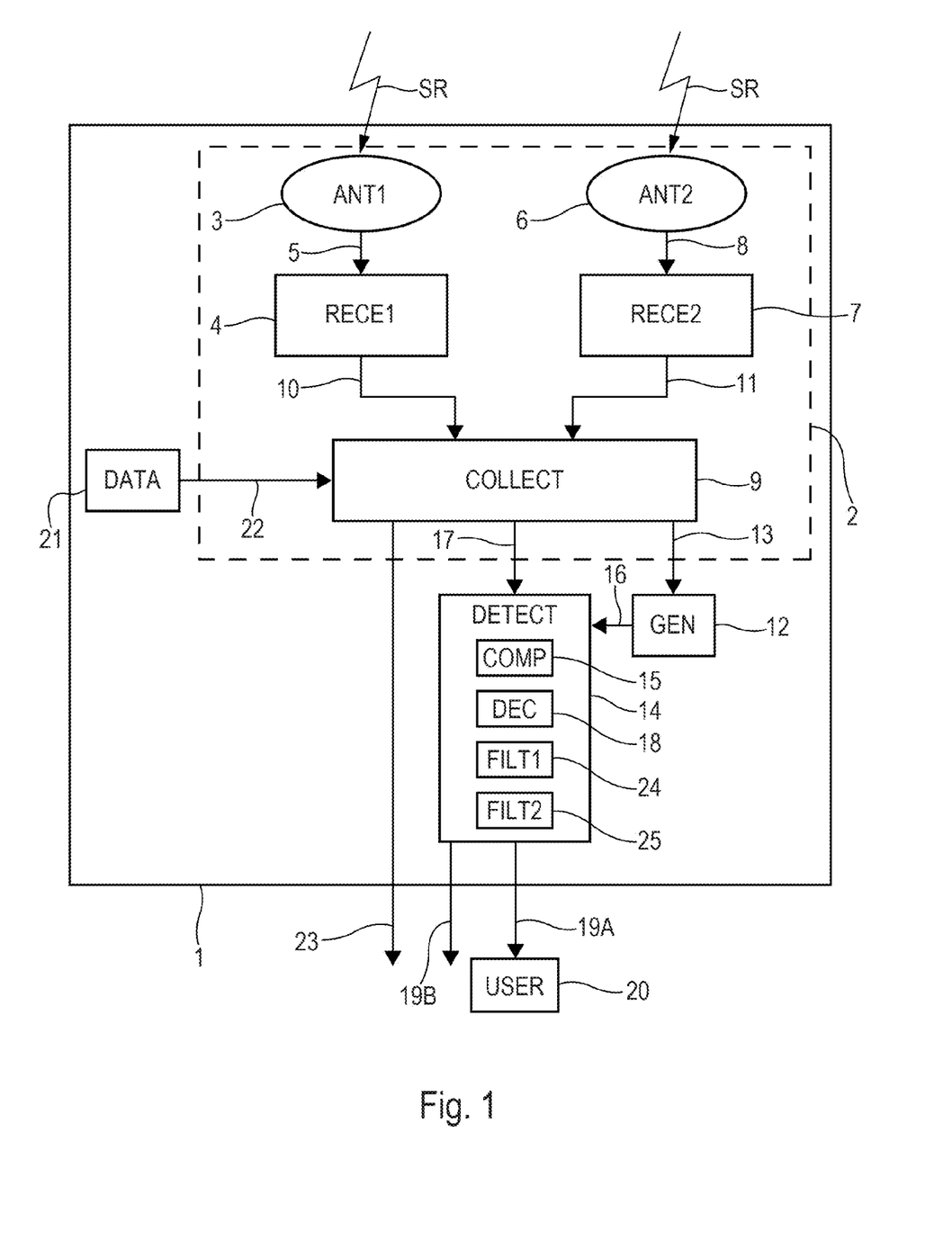
FIG. 1 is the block diagram of a particular embodiment of a system for the automatic detection of a jamming of a satellite navigation system.

The system 1, illustrating the disclosure herein and shown diagrammatically in a particular embodiment in FIG. 1, is a system for the automatic detection of a jamming of a satellite navigation system of the GNSS type (hereafter called "GNSS system"). It can be any known GNSS system, such as the GPS system, the Galileo system, etc.

Figure 2:
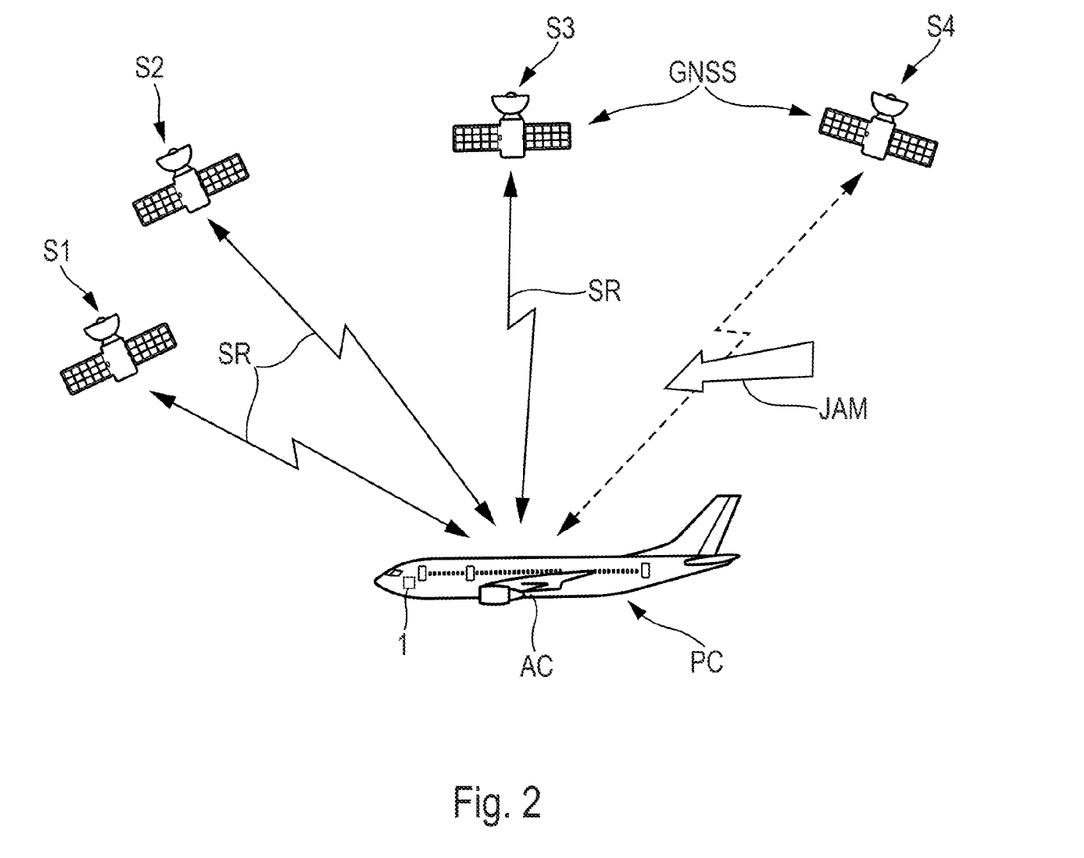
FIG. 2 diagrammatically shows an aircraft using a satellite navigation system.

The system 1 is at least partly installed in an aircraft AC, in particular in a transport aeroplane, and notably comprises a reception unit 2 configured to track, in the usual way, satellites of the GNSS system, some of which S1 to S4 are shown diagrammatically in FIG. 2 by way of illustration.

The reception unit 2 comprises, in the usual way, as shown in FIG. 1:
- an antenna 3 ANT1 configured to detect and receive radiofrequency signals SR from satellites S1 to S4 of the GNSS system;
- a receiver 4 RECE1 connected to the antenna 3 and configured to receive the signals detected by the antenna 3 by the intermediary of a link 5. The receiver 4 also determines the number of satellites actually tracked (called the "tracked number"), that is to say the number of satellites from which it has received signals (via the antenna 3);
- an antenna 6 ANT2 configured to detect and receive radiofrequency signals SR from satellites S1 to S4 of the GNSS system;
- a receiver 7 RECE2 connected to the antenna 6 and configured to receive the signals detected by the antenna 6 by the intermediary of a link 8. The receiver 7 also determines the number of satellites actually tracked (called the "tracked number"), that is to say the number of satellites from which it has received signals (via the antenna 6); and
- a collecting unit 9 COLLECT which is notably connected, by the intermediary of links 10 and 11, to the receiver 4 and to the receiver 7 respectively, and which is configured to collect data, in particular from the receivers 4 and 7.

The collecting unit 9 notably receives the tracked number, such as determined by the receivers 4 and 7. If the tracked number determined by the receiver 4 is different from the tracked number determined by the receiver 7, it is considered that one of the acquisition channels (antenna-receiver) is faulty and the data is not taken into account.

The system 1 which, in the embodiment shown in FIG. 1 is intended to be installed in the aircraft AC (FIG. 2), comprises, in addition to the reception unit 2:
- a generation unit 12 GEN configured to generate a so-called expected number corresponding to the number of satellites of the GNSS system that the reception unit 2 is expected to be tracking at the current time. This generation unit 12 can, for example, be connected to the collecting unit 9, via a link 13;
- a detection unit 14 DETECT comprising:
  - a comparison part 15 COMP configured to compare a number considered as a reference, that is to say the expected number (received from the generation unit 12 by the intermediary of a link 16), with the tracked number corresponding to the number of satellites that the reception unit 2 is actually tracking (at the time in question) and received from the collecting unit 9 (of the reception unit 2) via a link 17; and
  - a decision part 18 DEC configured to detect (or not) a jamming, as a function of the result of the comparison carried out by the comparison part 15, as described below, and to send detection data in the event of detection of a jamming; and at least one transmission unit (or link) 19A, 19B configured to transmit, if need be (that is to say in the event of detection), detection of a jamming data to at least one user device 20 USER.

The system 1 comprises, moreover, a set 21 of data sources DATA, which generates data as described below and transmits it via a link 22 to the collecting unit 9. This set 21 comprises usual approaches of the aircraft AC notably making it possible to determine the current values of at least some of the following parameters of the aircraft: the position, the altitude, the ground speed, and the attitude (roll, yaw, pitch).

In a first (preferred) embodiment, the generation unit 12 generates, as the expected number, the average of the number of satellites actually tracked by the reception unit 2 over a sliding time window. This time window has a predetermined duration, for example ten minutes. It begins before the current time and ends at the current time.

This average makes it possible to filter the satellite slopes and thus to serve as a reference value, given that it is not coherent that several satellites are no longer detectable over as short a time window.

Moreover, in a second embodiment, the generation unit 12 generates the expected number, from the current (geographic) position PC of the aircraft AC (FIG. 2), from the current time and from a satellite almanac of the usual type. This satellite almanac indicates the position (in the sky) of the satellites S1 to S4 of the GNSS system as a function of time. On this basis of this data, it is easy to determine the satellites (and therefore the number of satellites) of the GNSS system that the aircraft AC is capable of detecting (at the time in question, that is to say at the current time, at the current position PC) using the reception unit 2.

In the example shown in FIG. 2, for reasons of simplification of the drawing, only four of the satellites of the GNSS system capable of being tracked by the aircraft AC in its current position PC have been shown. Among these satellites S1 to S4, the satellites S1, S2 and S3 are really tracked by the reception unit 2 of the aircraft AC which receives radiofrequency signals SR from these satellites S1, S2 and S3. On the other hand, the reception unit 2 does not receive the signals from the satellite S4 because of a jamming illustrated by an arrow JAM.

In the context of the disclosure herein, the decision part 18 detects a jamming when the difference between the expected number and the tracked number is greater than a predetermined positive number, preferably 3. A jamming is thus detected when there is a drop (or reduction) in the number of tracked satellites.

Preferably, the drop in the number of tracked satellites must be observed simultaneously by the two receivers 4 and 7 of the reception unit 2 in order to result in the detection of a jamming.

The jamming detection data is transmitted:
to at least one user device 20 installed in the aircraft AC, via the link 19A; and/or
to a user device (not shown in FIG. 1) situated outside of the aircraft, via the link 19B.

The detection unit 14 considers that a jamming is and remains detected as long as the difference (between the expected and tracked numbers) is not zero. In order to do this, the system 1 carries out its processings repetitively. When, after a jamming detection, the difference becomes zero again, the detection unit 14 considers that the aircraft AC is no longer subject to a jamming, either because the jamming source has stopped functioning or because the aircraft AC has left the area in which the jamming was effective.

The detection of the jamming is therefore effectively validated (by the decision part 18) when the difference is greater than 3 (when the predetermined positive number is equal to 3). However, the detection unit 14 counts the duration of the jamming from the moment when the difference is greater than or equal to 1, a corresponding time T0 then being stored. In fact, the jamming really begins as soon as the difference is not zero, even if it is not yet confirmed. If the difference becomes zero again without exceeding the value 3, then the storage of the time T0 is cancelled. The jamming duration corresponds to the difference between this time T0 and the time at which the difference becomes zero again.

Moreover, in a particular embodiment, the system 1 comprises a filtering unit 24 FILT1 which forms part, for example, of the detection unit 14. This filtering unit 24 is configured to not take jamming detection data into account when the aircraft has a current lateral attitude (or current roll angle) greater than a maximum lateral attitude (or maximum roll angle), for example 10°. In fact, during a turn of the aircraft, because of the roll generated in this case, a part of the aircraft, notably its fuselage, can mask signals generated by satellites of the GNSS system, which cannot therefore be detected by the antennas 3 and 6.

In order to avoid a false detection, such a situation is not therefore taken into account. In order to do this, either the detection unit 14 carries out its usual processings and the result is not taken into account in this situation (current lateral attitude greater than the maximum lateral attitude), or the processings of the detection unit 14 are suspended during this situation. The current lateral attitude, used by the filtering unit 24 for detecting this situation, is determined by the set 21 of data sources.

Moreover, in another particular embodiment, the system 1 comprises a filtering unit 25 FILT2 which forms, for example, part of the detection unit 14. This filtering unit 25 is configured not to take detection data into account when the aircraft AC is on the ground.

More precisely, this filtering unit 25 is configured not to take jamming detection data into account when the aircraft AC has a current ground speed less than a limit ground speed, for example of 120 knots. In fact, on the ground, buildings can generate maskings or can be the source of reflections of signals which can falsify the measurements.

In order to avoid a false detection, such a situation is not therefore taken into account. In order to do this, either the detection unit 14 carries out its usual processings and the result is not taken into account in this situation (current ground speed less than the ground speed limit), or the processings of the detection unit 14 are suspended during this situation. The current ground speed, used by the filtering unit 25 in order to detect this situation, is determined by the set 21 of data sources.

In a first embodiment, the whole of the system 1 (including the detection unit 14), such as shown in FIG. 1, is installed in the aircraft AC.

As a user device 20, there can be provided in this case:
a warning device, of the visual and/or audible type, making it possible to warn the crew of the aircraft of a detection of a jamming, in particular so that it can adapt the operations of the aircraft if necessary; and/or
a configuration device to reconfigure the systems of the aircraft so that they take this detection data into account, that is to say that they do not take navigation data of the GNSS system into account as long as a jamming is detected.

In this case, a dedicated system or a pilot of the aircraft can also warn air traffic control so that it can adapt the management of air traffic if necessary or issue notifications in the case of repeated acts of jamming over a given region.

Figure 3:
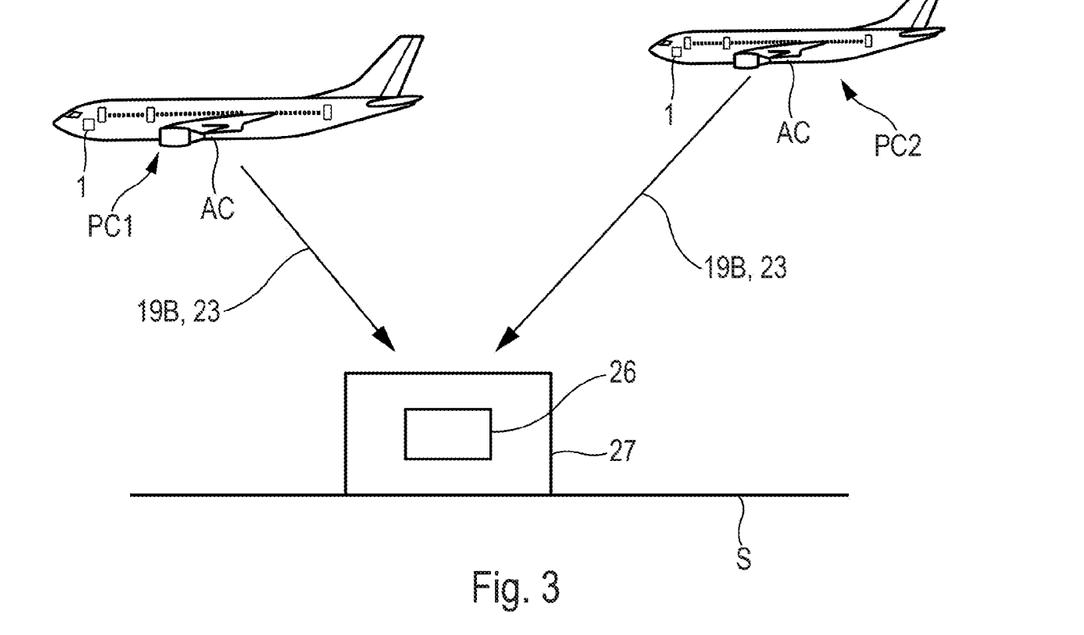
FIG. 3 is a diagrammatic illustration of a particular embodiment of an automatic detection system, some of the elements of which are installed in a data processing device situated on the ground.

Moreover, in a second embodiment, a part of the system 1 (and in particular the detection unit) is installed in a data processing device 26 installed in a station 27 on the ground S and, as shown in FIG. 3, it is connected by the data transmission link 19B to the reception unit 2 installed in an aircraft AC.

In this second embodiment, the data processing device 26 therefore comprises a part of the system 1, and in particular the detection unit 14. In this case, it is connected to one or more parts of the system 1, which are installed in the aircraft, and receives data from these parts. By way of example, it can be connected to the collecting unit 9 and receive the data collected by the latter on the aircraft, by the intermediary of a data transmission link 23 (FIG. 1). In this case, the detection is carried out on the ground by the detection unit forming part of the data processing device 26, using data received via the data transmission link 23. The data processing device 26 on the ground can be connected to other on-board parts of the system 1, for example to the set 21 of data sources.

In the case of detection of jamming, the data processing device 26 or an operator on the ground can:
  warn air traffic control so that it can adapt the management of air traffic if necessary or issue notifications in the case of repeated acts of jamming over a given region; and/or
  warn the authorities managing radiofrequency transmissions so that they can stop the transmission sources, for example illegal transmissions or failures of television broadcasting transmitters.

In a variant embodiment, the data processing device 26 is connected to the detection unit 14 (which in this case is installed in the aircraft) via the data transmission link 19B and it receives detection data from the aircraft.

In this second embodiment, the data processing device 26 is therefore capable of receiving data from a plurality of different aircraft each equipped with a reception unit, as shown in the example shown in FIG. 3. In this example, the data processing device 26 receives data from two aircraft AC situated in current positions PC1 and PC2.

The data processing device 26 can thus collect data from a plurality of aircrafts AC, for example in order to consolidate the data and/or in order to produce (geographic) jamming maps.

The data processing device 26 or another user device is configured to generate a geographic map from detection data received from a plurality of aircraft during flights of the latter. In order to produce a map, use is also made of the position and the altitude of the aircraft, generated by the set 21 of data sources installed in the aircraft.

A jamming map indicates, over a given geographic area, if need be, the zone or zones over which a jamming is detected. A colour code can be provided on the jamming map for visually differentiating the parts of these zones from each as a function of the number of aircraft having been subjected to a jamming.

Moreover, in the context of the disclosure herein, the decision part 18 can be configured to detect disturbances of GNSS signals other than jamming.

In a particular embodiment, the decision part 18 is configured to detect a masking by at least one building on the ground. In order to do this, the filtering on the ground carried out by the filtering part 25 is suppressed, and a detection is carried out on the ground in order to detect anomalies in the received signals, likely to have been generated by a masking.

Moreover, in another particular embodiment, the decision part 18 is configured to detect an ionospheric disturbance, in flight. In this case, the decision part 18 detects an ionospheric disturbance when the difference between the expected number and the tracked number is greater than 2, while the data relating to a detection of jamming has been removed.

The system 1, such as described above, is therefore capable of detecting, automatically, a GNSS jamming and to distinguish it from other sources of interference.

This detection notably makes it possible:
  to warn the crew of the aircraft so that it can adapt the operations of the aircraft if necessary;
  to reconfigure systems of the aircraft in order to take jamming detection data into account;
  to warn air traffic control so that it can adapt the management of air traffic if necessary or issue notifications in the case of repeated acts of jamming over a given region; and
  to warn the authorities managing radiofrequency transmission so that they can stop the transmission sources, for example illegal transmissions or failures of television broadcasting transmitters.

Figure 4:
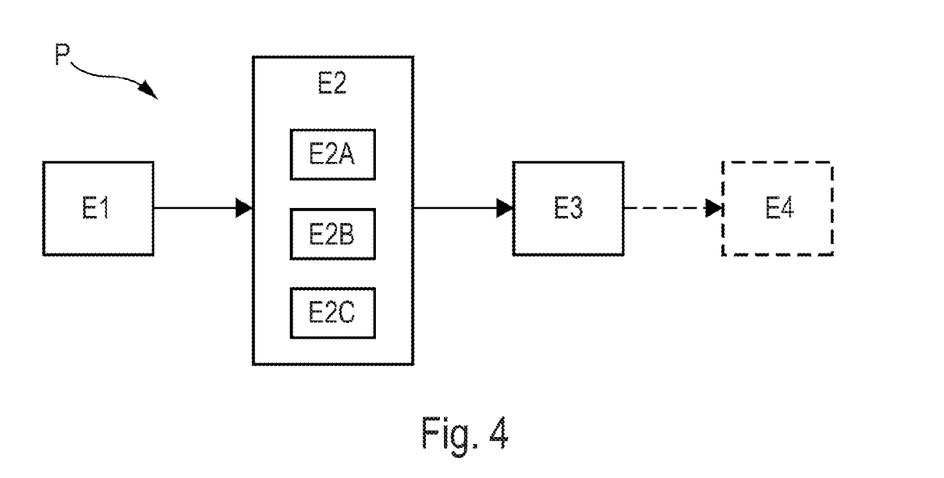
FIG. 4 is a diagrammatic illustration of the main steps of a method for the automatic detection of a jamming of a satellite navigation system.

The system 1, such as described above, is capable of using a method P for the automatic detection of a jamming of a satellite navigation system, shown in FIG. 4, using a system 1 (FIG. 1) comprising at least one reception unit 2 installed in an aircraft AC.

The method P comprises at least the following series of successive steps, which is used repetitively, during the movement of the aircraft AC, principally during its flight:
  a generation step E1, implemented by a generation unit 12 (FIG. 1) consisting of or comprising generating a so-called expected number corresponding to the number of satellites that the reception unit 2 is expected to be tracking;
  a detection step E2, implemented by a detection unit 14, comprising:
    a comparison sub-step E2A, implemented by a comparison part 15, consisting of or comprising comparing the expected number with a so-called tracked number corresponding to the number of satellites that the reception unit 2 is actually tracking; and
    a decision sub-step E2B, implemented by a decision part 18, consisting of or comprising detecting a jamming, as a function of the result of the comparison carried out in the comparison sub-step E2A and sending detection data in the event of detection of a jamming, and
  a transmission step E3, implemented by a transmission unit 19A, 19B, consisting of or comprising transmitting, if need be, the detection of a jamming data to at least one user device 20.

The detection step E2 can also comprise one or more auxiliary sub-steps E2C, for example one or more filtering sub-steps for carrying out the abovementioned filterings and/or one or more detection sub-steps consisting of or comprising detecting other types of interference as described above.

The method P also comprises a step E4 consisting of or comprising carrying out appropriate actions, such as mentioned above, in the case of detection of a jamming. In particular, the step E4 can generate a jamming map from detection data received from a plurality of aircraft.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" by either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatic detection of a jamming of a satellite navigation system, using a detection system comprising at least one reception unit installed in an aircraft and configured to track satellites of the satellite navigation system, the method comprising steps of:
a generation step, implemented by a generation unit, comprising generation of an expected number corresponding to a number of satellites that the reception unit is expected to track;
a detection step, implemented by a detection unit, comprising:
a comparison sub-step, implemented by a comparison part, comprising comparing the expected number with a tracked number corresponding to a number of satellites that the reception unit is actually tracking; and
a decision sub-step, implemented by a decision part, comprising detecting a jamming as a function of a result of the comparison implemented in the comparison sub-step, a jamming being detected when the expected number is greater than the tracked number and a difference between the expected number and the tracked number is greater than three, and emitting detection data in an event of detection of a jamming; and
a transmission step, implemented by a transmission unit, comprising transmitting, jamming detection data to at least one user device.

2. The method according to claim 1, wherein a series of the steps are used in a repetitive manner.

3. The method according to claim 1, wherein the reception unit comprises a first receiver connected to a first antenna and configured to receive signals detected by the first antenna and a second receiver connected to a second antenna and configured to receive signals detected by the second antenna,
wherein the comparison sub-step comprises comparing the expected number with the tracked number for each of the two receivers first receiver and the second receiver; and
wherein the decision sub-step comprises detecting a jamming uniquely when results of two comparisons implemented in the comparison sub-step each correspond to a jamming.

4. The method according to claim 1, wherein the generation step generates, as an expected number, an average of the number of satellites actually tracked by the reception unit over a sliding time window, the time window having a predetermined duration, being prior to a current time and ending at the current time.

5. The method according to claim 1, wherein the generation step generates the expected number, from the current position of the aircraft, from a current time and from a satellite almanac which indicates a position of the satellites of the satellite navigation system as a function of time.

6. The method according to claim 1, comprising a first filtering step comprising not taking the detection data into account when the aircraft has a current lateral attitude greater than a maximum lateral attitude.

7. The method according to claim 1, wherein the decision sub-step comprises detecting ionospheric disturbance, in flight.

8. The method according to claim 1, comprising an additional step of generating a geographic jamming map from detection data received from a plurality of aircraft.

9. The method according to claim 1, wherein the transmission step comprises transmitting the jamming detection data to at least one user device installed in the aircraft and/or to at least one user device situated outside of the aircraft.

10. A system for automatic detection of a jamming of a satellite navigation system, the detection system comprising at least one reception unit installed in an aircraft and configured for tracking satellites of the satellite navigation system and comprising:
a generation unit configured for generating an expected number corresponding to a number of satellites that the reception unit is expected to track; a detection unit comprising:
a comparison part, configured for comparing the expected number with a tracked number corresponding to a number of satellites that the reception unit is actually tracking; and
a decision part, configured for detecting a jamming as a function of a result of a comparison implemented by the comparison part, a jamming being detected when the expected number is greater than the tracked number and a difference between the expected number and the tracked number is greater than three, and for sending detection data in an event of detection of a jamming; and
a transmission unit, configured for transmitting jamming detection data to at least one user device.

11. The system according to claim 10, wherein the reception unit comprises at least a first antenna, a second antenna, a first receiver associated with the first antenna, a second receiver associated with the second antenna, and a data collecting unit, and wherein:

the comparison part is configured for comparing the expected number with the tracked number for each of the two receivers; and the decision part is configured for detecting a jamming uniquely when results of two comparisons made by the comparison part each correspond to a jamming.

12. The system according to claim 10, wherein the detection unit is installed in the aircraft.

13. The system according to claim 10, wherein the detection unit is installed in a data processing device installed in a station on ground and connected by a data transmission link at least to the reception unit installed in the aircraft.

14. The system according to claim 13, wherein the data processing device is configured for receiving data from a plurality of different aircraft each equipped with a reception unit.

15. The method according to claim 1, comprising a second filtering step comprising not taking the detection data into account when the aircraft is on ground.

16. The method according to claim 1, wherein the decision sub-step comprises masking by at least one building, on ground.

17. A method for automatic detection of a jamming of a satellite navigation system, using a detection system comprising at least one reception unit installed in an aircraft and configured to track satellites of the satellite navigation system, the method comprising steps of:

a generation step, implemented by a generation unit, comprising generation of an expected number corresponding to a number of satellites that the reception unit is expected to track;

a detection step, implemented by a detection unit, comprising: a comparison sub-step, implemented by a comparison part, comprising comparing the expected number with a tracked number corresponding to a number of satellites that the reception unit is actually tracking; and a decision sub-step, implemented by a decision part, comprising detecting-if need-be-a jamming as a function of a result of the comparison implemented in the comparison sub-step, a jamming being detected when the expected number is greater than the tracked number and a difference between the expected number and the tracked number is greater than 3, and emitting detection data in an event of detection of a jamming; and a transmission step, implemented by a transmission unit, comprising transmitting jamming detection data to at least one user device;

wherein the reception unit comprises a first receiver channel connected to a first antenna and configured to receive signals detected by the first antenna and a second receiver channel connected to a second antenna and configured to receive signals detected by the second antenna;

wherein the comparison sub-step comprises comparing the expected number with the tracked number for each of the first receiver channel and the second receiver channel; and wherein the decision sub-step comprises detecting a jamming uniquely when results of two comparisons implemented in the comparison sub-step each correspond to a jamming.

\* \* \* \* \*